(12) United States Patent
Tu et al.

(10) Patent No.: US 9,744,495 B2
(45) Date of Patent: Aug. 29, 2017

(54) DEVICES AND METHODS FOR REMOVING NANO-PARTICULATES FROM GASES

(75) Inventors: Juan Tu, Nanjing Jiangsu (CN); Han Lin, Nanjing Jiangsu (CN); Bin Liang, Nanjing Jiangsu (CN)

(73) Assignee: Nanjing University, Nanjing Jiangsu (CN)

( * ) Notice: Subject to any disclaimer, the term of this patent is extended or adjusted under 35 U.S.C. 154(b) by 324 days.

(21) Appl. No.: 14/427,037

(22) PCT Filed: Sep. 10, 2012

(86) PCT No.: PCT/CN2012/081187
§ 371 (c)(1),
(2), (4) Date: May 8, 2015

(87) PCT Pub. No.: WO2014/036737
PCT Pub. Date: Mar. 13, 2014

(65) Prior Publication Data
US 2015/0298042 A1    Oct. 22, 2015

(51) Int. Cl.
*B01D 49/00*    (2006.01)
*B01D 47/06*    (2006.01)
*B01D 5/00*    (2006.01)

(52) U.S. Cl.
CPC .......... *B01D 47/06* (2013.01); *B01D 5/0033* (2013.01); *B01D 47/066* (2013.01); *B01D 49/006* (2013.01)

(58) Field of Classification Search
CPC .... B01D 5/0033; B01D 47/06; B01D 47/066; B01D 49/006

(Continued)

(56) References Cited

U.S. PATENT DOCUMENTS 3,023,966 A * 3/1962 Cox ................ G01V 1/366
324/76.33
3,643,623 A * 2/1972 Eng ................ B01D 47/06
116/137 A (Continued)

FOREIGN PATENT DOCUMENTS

CN    102380275 A    3/2012
CN    102933280 A    2/2013

(Continued)

OTHER PUBLICATIONS

Reeks et al., The dispersive effects of basset history forces on particle motion in a turbulent flow, *Physics of Fluids* (1984), 27(7):1573-1582.

(Continued)

*Primary Examiner* — Frank Lawrence
(74) *Attorney, Agent, or Firm* — Pepper Hamilton LLP

(57) ABSTRACT

Systems and methods are disclosed for removing nano-particulates from a gas. The systems may include a chamber to contain the particulate-containing gas, a source of the gas, a source of water vapor, a source of a supersonic gas, and at least one ultrasonic transducer in contact with the chamber. The chamber may also include one or more receptacles to receive the particulates. The methods may include introducing the particulate-containing gas and the water vapor into the chamber. A gas may be introduced into the chamber at supersonic speeds thereby cooling the water vapor to form nucleating ice crystals. The ultrasonic transducers may then introduce ultrasonic power into the chamber thereby causing the particulates to contact the ice crystals. The nucleating crystals, with their attached particulates, may then fall under gravity to be captured in the receptacles.

26 Claims, 5 Drawing Sheets

(58) Field of Classification Search
USPC ......... 95/29, 42, 149; 96/243, 256, 267, 389
See application file for complete search history.

(56) References Cited

U.S. PATENT DOCUMENTS

| | | |
|---|---|---|
| 6,280,502 B1 | 8/2001 | van Veen et al. |
| 6,799,730 B2 | 10/2004 | Peng et al. |
| 2005/0016380 A1* | 1/2005 | Matsuura ................ B01D 3/06 96/389 |
| 2012/0132071 A1* | 5/2012 | Kusuura .............. B01D 47/066 95/65 |
| 2013/0162946 A1 | 6/2013 | Dobashi et al. |

FOREIGN PATENT DOCUMENTS

| | | |
|---|---|---|
| DE | 10014565 A1 | 7/2001 |
| WO | WO2011/152796 A1 | 12/2011 |

OTHER PUBLICATIONS

Shihong et al., A Study of Mechanisms on Ice Crystals Generation Triggered by Ron-Catalysis Method, *Acta Meteorologica Sinica* (May 1991), 49(2):198-204—English equivalent not available.
Yung-Chio et al., Aerosol Agglomeration Due to Forces in Sound Field, *Journal of Nanjing University (Natural Sciences)* (Jun. 1964), 8(2):249-265—English equivalent not available.
International Search Report and Written Opinion for counterpart application PCT/CN2012/081187 dated Jun. 20, 2013.
Vittori et al., Scavenging of Atmospheric Particles by Ice Crystals, *Journal of the Atmospheric Sciences* (Sep. 1967), 24:533-538.

\* cited by examiner

```
┌─────────────────────────┐
│  Introducing a first gas │
│ comprising particulates  │
│   into the chamber       │
│         410              │
└───────────┬──────────────┘
            │
            ▼
┌─────────────────────────┐        ┌──────────────────────────────┐
│ Introducing atomized     │        │ Allowing water droplets to   │
│ water into the chamber   │        │ form on some nucleating ice  │
│         420              │        │         crystals             │
└───────────┬──────────────┘        │            450               │
            │                       └──────────────┬───────────────┘
            ▼                                      │
┌─────────────────────────┐                        ▼
│ Introducing ultrasonic   │        ┌──────────────────────────────┐
│ power into the chamber   │        │ Allowing the ultrasonic      │
│         430              │        │ power to induce some of the  │
└───────────┬──────────────┘        │ particulates to contact the  │
            │                       │ water droplets               │
            ▼                       │            460               │
┌─────────────────────────┐        └──────────────┬───────────────┘
│ Introducing a second gas │                      │
│ at ultrasonic speeds into│                      ▼
│ the chamber thereby      │        ┌──────────────────────────────┐
│ cooling the material in  │        │ Collecting the water droplets│
│ the chamber and forming  │        │ and the particulates         │
│ nucleating ice crystals  │        │            470               │
│         440              │        └──────────────────────────────┘
└──────────────────────────┘
```

FIG. 4

DEVICES AND METHODS FOR REMOVING NANO-PARTICULATES FROM GASES

CLAIM OF PRIORITY

This application is a U.S. national stage filing under 35 U.S.C. §371 of International Application No. PCT/CN2012/081187 filed Sep. 10, 2012 and entitled "Devices and Methods for Removing Nano-Particulates from Gases," the disclosure of which application being incorporated by reference in its entirety herein.

BACKGROUND

Air- and gas-borne particulates may comprise a significant environmental hazard. The inhalation of such particulates may exacerbate a number of bronchial and pulmonary conditions such as asthma and chronic obstructive pulmonary diseases. Particulates may be removed from ambient air or gases by a number of different methods. Fabric filters may be useful for filtering particulates having sizes of about 0.5 micron to several hundred microns. HEPA (high efficiency particulate air) filters may be efficient at removing particulates larger than 0.3 microns. Wet scrubbers may be efficient for removing particulates greater than about 0.3 microns, but may lose efficiency when filtering smaller-sized particulates. Electrostatic precipitators may show lowered collection efficiencies for particulates of about 0.1 micron to about 1.0 micron in size.

Many of these systems may be used effectively at the major air intake or exhaust ports of a building such as a factory or home. Fabric or HEPA filters may be commonly used at the air intake side of household furnaces. Wet scrubbers and/or electrostatic precipitators may be used to remove pollutants from exhaust gases at industrial sites. However, these systems may generally be designed to remove particulates from air constantly flowing from one space to another, for example from an open building exterior into the building's enclosed interior. Such systems may not be useful for removing particulates generated in situ, for example cooking smoke within a kitchen. Small electrostatic precipitators may be used to remove particulates from an at least partially enclosed environment, but such units may require frequent maintenance to remove particulates from the ground plate.

Therefore, it is desirable to provide an inexpensive, low maintenance system capable of removing ultra-fine particulates from air especially from within an at least partially enclosed environment.

SUMMARY

In an embodiment, a system for removing particulates from a particulate-containing gas may include a chamber, a source of a particulate-containing gas, a source of a supersonic gas connected to the chamber, a source of water vapor connected to the chamber, and at least one ultrasonic transducer acoustically coupled to the chamber.

In an embodiment, a method of removing particulates from a gas may include introducing a particulate-containing gas into a chamber, introducing atomized water as water vapor into the chamber, introducing ultrasonic power into the chamber, introducing a gas at supersonic speed into the chamber thereby cooling some of the water vapor to form nucleating ice crystals, allowing water droplets to form on some of the nucleating ice crystals, allowing the ultrasonic power to induce some of the particulates to contact the water droplets, and collecting the water droplets along with their associated particulates.

BRIEF DESCRIPTION OF THE DRAWINGS

FIG. 4 is a flow chart of an embodiment of a method of removing nano-particulates from a gas in accordance with the present disclosure.

DETAILED DESCRIPTION

It is frequently noted that outdoor pollutant levels may decrease after a rain or snow storm. It is believed that the particulates may be captured by the falling rain or snow, and thus carried to the ground by the precipitation. Snow may be particularly useful as the snowflakes may provide a larger surface area and thus may be able to attract and hold more particulates than rain. It is reasonable to suspect that a system for capturing particulates may be based on this principle by providing conditions under which particulates may be captured by artificially created rain or snow. One difficulty with this approach, however, is that the particulates, which may have a size of about 10 nm to about 1 micron, may be captured mostly by passive means. In an outdoor environment, wind may help drive the snow, ice, or rain against the particulates, but the particulates may more frequently be captured as the rain or snow simply fall under gravity. Thus, the probably of particulate capture under naturally occurring conditions may depend on random processes causing inter-particulate contact. Such processes may not necessarily be efficient. The efficiency of particulate capture by rain or snow nuclei may be improved by providing a mechanism by which the particulates may be impelled by a force against the falling water. Such a force may be provided, for example, by the introduction of ultrasonic power in a direction lateral or transverse to the gravitational trajectory of the nuclei.

Figure 1:
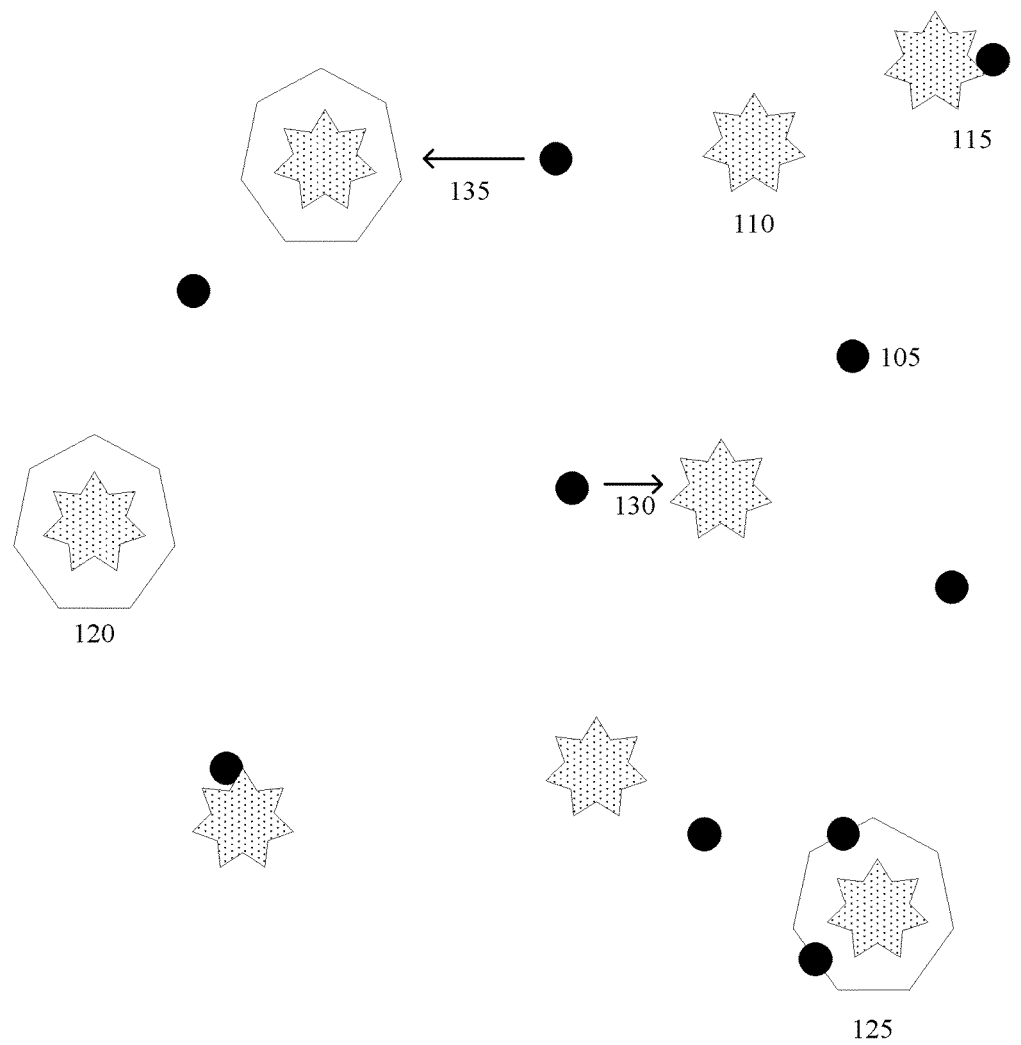
FIG. 1 illustrates a gas containing nano-particulates and nucleating ice crystals in accordance with the present disclosure.

FIG. 1 illustrates an embodiment of this process. Small particulates 105 may be suspended within a gas or air. The air may also contain ice crystal nuclei 110 that can arise when water vapor is supercooled. Under naturally occurring conditions, water may condense around such ice crystal nuclei 110 to form either rain or snow, depending on ambient conditions. The ice crystal nuclei 110 may contact the particulates 105 to form ice crystal nucleus aggregates 115. Alternatively, the ice crystal nuclei 110 may serve as nuclei around which water may condense to form water droplets 120. Such water droplets 120 may also contact the particulates 105 to form water droplet aggregates 125. It is reasonable to suspect that such water droplets 120, having a greater surface area than the ice crystal nuclei 110, may contact and hold a larger number of particulates 105.

As disclosed above, under naturally occurring conditions, the ice crystal nuclei 110 or water droplets 120 may contact the particulates 105 only as the droplets or ice crystal nuclei fall due to gravity. However, an introduction of a force not along the direction of gravity (such as a lateral, transverse, or oblique force), such as ultrasonic power at an appropriate frequency, may help drive the particulates 105 into the ice crystal nuclei 130, or into the water droplets 135. Such an additional driving force may increase the number of particulates 105 captured by the ice crystal nuclei 110 or water droplets 120 by increasing the probability of contact. It may be appreciated that particulates having a hydrophilic nature, such as $SiO_2$ and $TiO_2$, may be readily captured by water and/or ice crystal nuclei. However, non-hydrophilic nanoparticulates, such as $Fe_2O_3$ and some types of ink or paint particulates may also be captured under these conditions.

Figure 2:
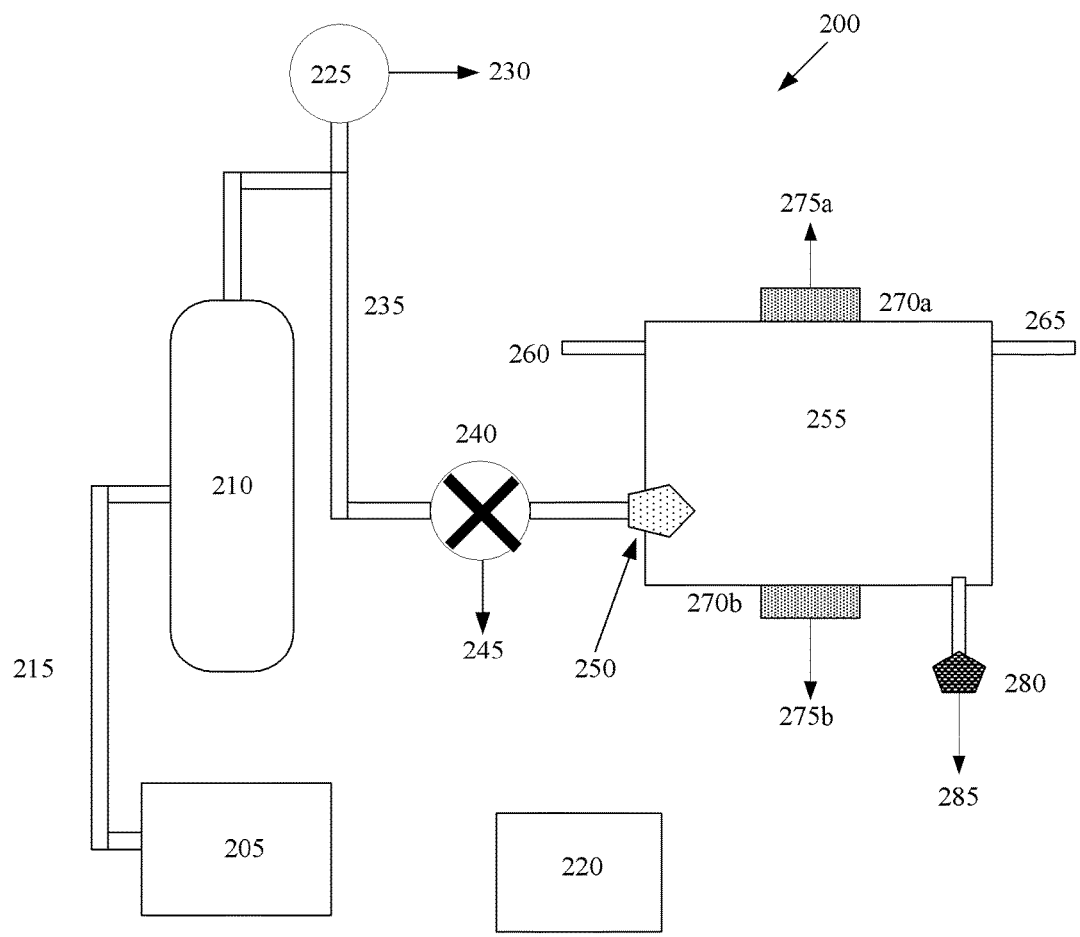
FIG. 2 illustrates an embodiment of a system for removing nano-particulates from a gas in accordance with the present disclosure.

FIG. 2 illustrates an embodiment of a system 200 for eliminating particulates from a gas, such as air, using a combination of atomized water and ultrasound. A chamber 255 may be provided in which the elimination process may occur. The chamber may be completely enclosed or partially enclosed. The chamber may have a volume of about $0.25$ $m^3$ to about 1 $m^3$. Examples of the chamber volume may include about $0.25$ $m^3$, about $0.3$ $m^3$, about $0.35$ $m^3$, about $0.4$ $m^3$, about $0.5$ $m^3$, about $0.6$ $m^3$, about $0.7$ $m^3$, about $0.8$ $m^3$, about $0.9$ $m^3$, about $1.0$ $m^3$, and ranges between any two of these values. In one embodiment, the chamber may have a volume of about $0.36$ $m^3$. The chamber may have a cross-sectional shape related to any closed or partly closed geometric shape, including, without limitation, a square, a circle, a parallelepiped, or an oval. In one embodiment, the chamber may have a rectangular cross section. In another embodiment, the chamber may have a circular cross section. The chamber may have a regular cross section shape or an irregular cross section shape. The chamber may be fabricated from a material having low acoustic impedance. Non-limiting examples of such materials may include plastics, metals, or combinations thereof. Such materials may include, without limitation, acrylonitrile/butadiene/styrene copolymer, polymethyl methacrylate acrylic glazing, black nylon, polystyrene, polyvinyl chloride, polyethylene, and combinations thereof. Any one or more of these materials may be used to fabricate the chamber. In some embodiments, the chamber walls may have a thickness of about 3 mm to about 10 mm. Examples of chamber wall thickness may include about 3 mm, about 4 mm, about 5 mm, about 6 mm, about 7 mm, about 8 mm, about 9 mm, about 10 mm, and ranges between any two of these values. In other embodiments, one or more of the chamber walls may have a thickness of greater than about 10 mm. The wall may all have the same thickness, or two or more may have different thicknesses.

The source of the particulate-containing gas may be from a specific gas source, such a container of gas. Alternatively, the source may be an open source such as outside air or a vehicle exhaust system. Alternatively, the particulate-containing gas may include ambient air in a room in which the system is located. The particulate gas may flow passively through the chamber 255, or it may be forced through the chamber. The gas entering and leaving the chamber 255 may be moved through the action of either a propelling device, such as a pump, or an evacuating device, such as an exhaust fan. The gas or air may enter the chamber 255 through an inlet valve or pipe 260, and may exit the chamber through an exit valve or pipe 265. Pumps, fans, vacuum devices, and other systems to force air into or out of the chamber may be connected to the inlet valve 260 or outlet valve 265.

Aerosolized water as water vapor may be introduced into the chamber 255. In one embodiment, the water vapor may be introduced into the chamber through a water inlet valve that may connect the output of an ultrasonic atomizer 280 to the chamber 255. In another embodiment, the ultrasonic atomizer 280 may be located within the chamber 255. The ultrasonic atomizer 280 may include at least one piezoelectric element to atomize liquid water into a vapor. The piezo-electric element may operate at one or more frequencies, for example, a frequency of about 0.1 MHz to about 1 MHz. Examples of ultrasonic atomizer piezo-electric frequencies may include about 0.1 MHz, about 0.2 MHz, about 0.4 MHz, about 0.6 MHz, about 0.8 MHz, about 1.0 MHz, and ranges between any two of these values.

As disclosed above, ice crystal nuclei may be induced within the chamber 255 by the sudden cooling of atomized or vaporous water. In one embodiment, the water vapor may be induced to form nucleating ice crystals by adiabatic cooling caused by the sudden expansion of a jet of a supersonic gas. In one embodiment, the cooling gas may be supplied from a tank of a compressed gas 205. The cooling gas may include any dry non-flammable gas. Non-limiting examples of the cooling gas may include dry air, dry argon, dry nitrogen, dry carbon dioxide, and combinations of such gases.

The compressed gas may be stored in a storage tank 210 prior to use. The gas in the storage tank 210 may be maintained in a pressurized state by means of a pressure pump or gas compressor (not shown) placed between the compressed gas tank 205 and the storage tank 210. Alternatively, a pump or compressor (not shown) may be used to force pressurized gas from the storage tank 210 into the chamber 255. The pressure of the cooling gas may be monitored by means of a pressure gauge 225 that may be located anywhere in the path 235 of the cooling gas between the storage tank 210 and the chamber 255.

A valve 240 may also be placed between the source of the cooling gas, such as the storage tank 210, and the chamber 255 along the path 235 of the gas. The valve 240 may be electronically controllable 245. The valve may be actuated so that the pressurized cooling gas may be introduced from the cooling gas source, such as the storage tank 210, into the chamber 255 through an accelerating inlet 250. In one embodiment, the accelerating inlet 250 may be a de Laval nozzle. The accelerating inlet 250 may be configured so that the cooling gas passing through it from the gas source side to the chamber interior side will experience a sudden acceleration. The acceleration of the gas, from the higher pressure source side of the accelerating inlet 250 to the lower pressure chamber side, may result in the cooling gas reaching a low temperature due to the sudden adiabatic expansion of the gas. The cooling gas may thus cause the formation of nucleating ice crystals of the atomized water previously introduced into the chamber 255.

As disclosed above with reference to FIG. 1, the nucleating ice crystals, with or without water condensed around them, may contact the particulates thereby trapping them into aggregate structures. While the nucleating ice crystals may contact the particulates during gravity-induced falling, additional force may be applied to the particulates to cause them to contact the nucleating ice crystals. Such forces, including lateral and oblique forces, may include those induced by acoustic power introduced into the chamber 255 by one or more ultrasonic transducers, **270*a* and 270*b*, associated with the chamber. In one embodiment, one or more ultrasonic transducers 270*a,b* may be in acoustic communication with an exterior surface of at least one wall of the chamber 255. In another embodiment, two or more transducers 270*a,b* may be in acoustic communication with opposing walls of the chamber 255. In an embodiment, one or more transducers 270*a,b*** may be associated with the chamber by being glued to one or more walls of the chamber 255. The number of transducers may be about 2 transducers to about 10 transducers. Examples of the number of transducers may include 2, 4, 6, 8, or 10 transducers and ranges between any two of these values. In one embodiment, an even number of transducers may be used. In another embodiment, two transducers may be used.

In one embodiment, the one or more ultrasonic transducers 270a,b may be piezo-electric transducers. The one or more ultrasonic transducers 270a,b may be configured to operate at one or more frequencies of about 1 MHz to about 100 MHz. Examples of operating frequencies may include about 1 MHz, about 2 MHz, about 5 MHz, about 10 MHz, about 20 MHz, about 25 MHz, about 50 MHz, about 75 MHz, about 100 MHz, and ranges between any two of these values. In one embodiment, the one or more transducers 270a,b may operate at about 1 MHz. The frequency at which the ultrasonic transducers 270a,b operate may determine, at least in part, the size of the particulates that may be induced to contact the nucleating ice crystals. The ultrasonic transducers 270a,b may also operate at a power sufficient to cause the particulates to contact the nucleating ice crystals. The one or more transducers 270a,b may operate at a power less than or about 750 W. In one embodiment, the one or more transducers may operate at about 75 W of power.

Chamber 255 may also be sized so that standing acoustic waves may be induced in the chamber when the one or more ultrasonic transducers 270a,b operate at their operating frequencies. In one embodiment, the chamber 255 may have a dimension with a size of about $(2n+1)/4$ times the wavelength of the acoustic energy emitted by the transducers, wherein n is a positive integer.

The system for removing nano-particulates from a gas or air may be controlled by an electronic controller 220. The electronic controller 220 may include, without limitation, a system bus, one or more CPUs in data communication with the system bus, one or more memory components in data communication with the system bus, one or more disk drives and disk drive controller components in data communication with the system bus, one or more interface components and controllers for such interface component in data communication with the system bus, one or more input and/or output data lines in data communication with the system bus, and one or more display units in data communication with the system bus. The system bus may serve as the main information highway interconnecting the other components of the controller 220. The one or more CPUs may be the central processing units of the system, performing calculations and logic operations required to execute a program. Read only memory (ROM) may be one embodiment of a static memory device, and random access memory (RAM) may be one embodiment of a dynamic memory device. The controller disk drives may include, for example, external or internal DVD drives, CD-ROM drives, or hard drives. Program instructions may be stored in the ROM and/or the RAM. Optionally, program instructions may be stored on a computer readable medium such as a compact disk or a digital disk or other recording medium, a communications signal or a carrier wave. A display interface may permit information from the bus to be displayed on the one or more display units in audio, graphic, or alphanumeric format. In addition, communication with external devices may occur using various communication ports. For example, data from the pressure gauge 225 may be transmitted to the controller 220 through a pressure gauge data line 230. Interface components may allow for receipt of data from input devices such as a keyboard, a mouse, a remote control, a pointing device and/or a joystick.

The controller 220 may further control the activity of one or more of the system components. In one embodiment, the valve 240 that admits the cooling gas into the chamber 255 may be controlled by the controller 220 over a valve control line 245. Control of valve 240 may include timing when the valve opens and closes, determining how long the valve should be opened, and/or a duty cycle for opening and closing the valve. The controller 220 may operate the valve 240 based at least in part on the pressure received from the pressure gauge 225. In one non-limiting embodiment, one or more temperature sensors may be associated with the chamber 255, and may provide a temperature value to the controller 220. The temperature value may be used, at least in part, by the controller 220 to control the activities of valve 240. In another non-limiting embodiment, the controller 220 may control the activities of the ultrasonic transducers 270a,b through transducer control lines 275a,b, respectively. The controller 220 may control one or more of the transducer activation state (on or off), acoustic power output, and/or frequency. In one non-limiting embodiment, the chamber 255 may include one or more acoustic power sensors to determine a measurement of acoustic power within the chamber. The one or more ultrasonic transducers 270a,b may be controlled, at least in part, by the measured ultrasonic power within the chamber 255. In yet another embodiment, the transducers 270a,b may also be controlled based on a measured temperature within the chamber 255, or the amount or timing of cooling gas introduced into the chamber by the valve 240. In still another non-limiting embodiment, the ultrasonic atomizer 280 may also be controlled by the controller 220 by means of an atomizer control line 285. In one non-limiting embodiment, the controller 220 may control the amount of water vapor introduced into the chamber 255 by means of controlling the power to a piezo-electric element associated with the atomizer 280. The controller 220 may control the amount of water introduced into the chamber 255 based at least in part on the chamber temperature, a state of the valve 240, or the ultrasonic power introduced into the chamber by one or more ultrasonic transducers 270a,b.

It may be understood that more than one controller may be used for system monitoring and control. Thus, an embodiment may include separate controllers for the valve 240, ultrasonic transducers 270a,b, and/or the atomizer 280. If more than one controller is used for data acquisition and control, the controllers may act independently or in concert, and may have one or more means of communicating information between and among them, including without limitation, internet communications or wireless communications.

Figure 3A:
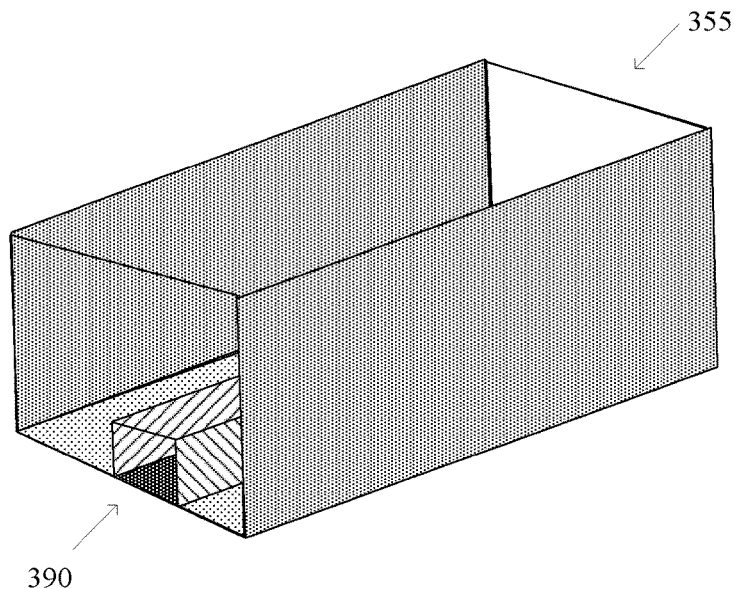
FIGS. 3A, 3B, 3C illustrate embodiments of receptacles that may be used in a system for removing nano-particulates from a gas in accordance with the present disclosure.
Figure 3B:
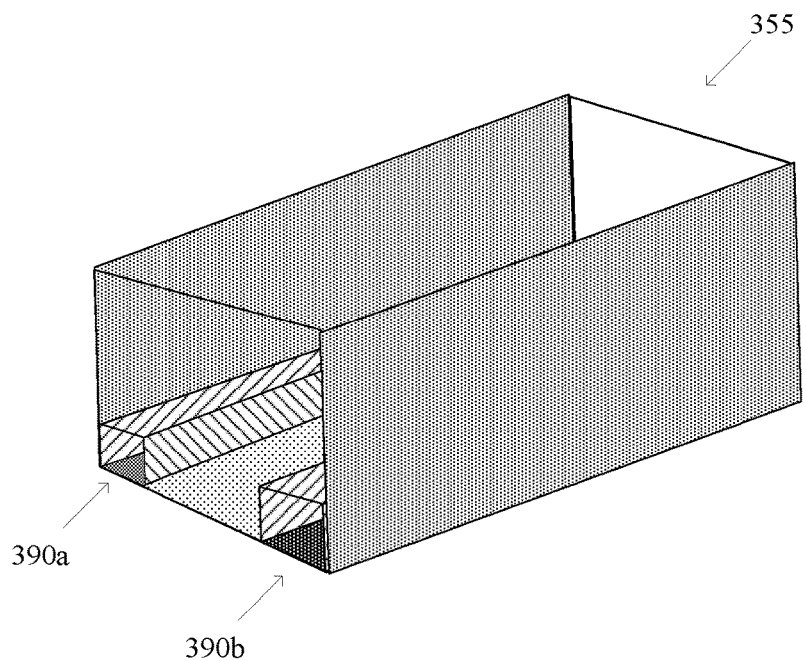
Figure 3C:
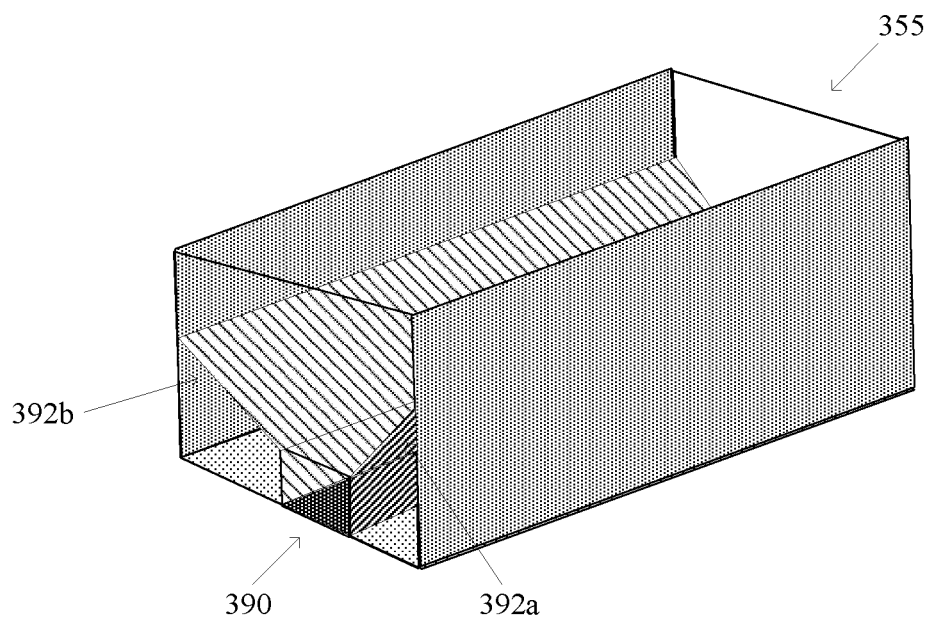

In addition to the system as illustrated in FIG. 2, receptacles may be provided to catch the precipitated nano-particulates. FIGS. 3A-3C illustrate some non-limiting examples of such receptacles. FIG. 3A illustrates a receptacle 390 placed within the chamber 355, approximately at the bottom. In one embodiment, the receptacle 390 may run the length of the chamber 355 while the width and height may be less than the width and height, respectively, of the chamber. FIG. 3B illustrates another non-limiting embodiment in which two receptacles, 390a and 390b may be placed on the bottom of the chamber 355. As illustrated in FIG. 3B, each receptacle 390a and 390b may be placed at the bottom of the chamber 355 and against an interior surface so as to capture precipitates, such as water droplets, that may condense on the chamber interior wall sides and run down the wall to the bottom of the chamber. FIG. 3C illustrates another non-limiting embodiment of a receptacle 390 placed at the bottom of the chamber 355. In this embodiment, the receptacle further includes fins 392a and 392b that may be disposed at an angle with respect to the sides of the receptacle 390 and may extend to contact the inner surface of the chamber 355 walls. The fins 392a,b may extend from the sides of the receptacles 390 to the chamber 355 wall interior surface, or may extend only part way from the receptacle to the chamber wall interior surface. If there are multiple receptacles, as illustrated in FIG. 3B, any one receptacle 390 may have fins 392a,b that may extend to contact one or more fins of another receptacle. The fins 392a,b may be disposed at any useful angle with respect to the sides of the receptacle 390. The fins may be at an angle of about 5 degrees from vertical to about 85 degrees from vertical. Examples of the angle the fins may make with respect to the vertical of the receptacle walls may be about 5 degrees, about 10 degrees, about 20 degrees, about 30 degrees, about 45 degrees, about 60 degrees about 70 degrees about 80 degrees about 85 degrees, and ranges between any two of these values. In one non-limiting embodiment, the receptacle 390 may be moveable. In another embodiment, the receptacle 390 may be disposable.

FIG. 4 is a flowchart illustrating one non-limiting embodiment of a method for removing nano-particulates from a gas. A gas, containing the particulates to be removed, may be introduced into a chamber 410. The gas may be a dry non-flammable gas, including, as a non-limiting example, dry air. In one non-limiting example, the gas including the particulates may be actively pumped into the chamber.

The particulates may include hydrophilic particulates, although non-hydrophilic particulates may also be included in the dry gas. Non-limiting examples of particulates may include silicon dioxide, titanium dioxide, magnetite, and/or hydrophilic or hydrophobic ink particulates. The particulates may have an average size of about 10 nm to about 1000 nm. Examples of average particulate size may include about 10 nm, about 20 nm, about 50 nm, about 100 nm, about 200 nm, about 250 nm, about 500 nm, about 750 nm, about 1000 nm, and ranges between any two of these values. In one embodiment, the particulates may have an average size of about 500 nm.

After the particulate-containing gas has been introduced into the chamber, an amount of atomized water may then be introduced into the chamber 420. In one embodiment, the atomized water or water vapor may be introduced in a continuous manner. In an alternative embodiment, the atomized water may be introduced in a pulsed manner into the chamber. The amount of water may be about 1 L to about 20 L. Examples of the amount of water introduced into the chamber may include about 1 L, about 2 L, about 5 L, about 10 L, about 15 L, about 20 L, and ranges between any two of these values.

The chamber containing the particulate-containing gas and water vapor may then be subjected to ultrasonic power 430. The ultrasonic power introduced into the chamber may have a wavelength sufficient to control the movement of the particulates. Equation 1 describes one non-limiting relationship between the ultrasonic power wavelength and the transverse force that may be applied to a particulate having a radius of about $R_0$:

$$F_{tr} = -\frac{2}{3}\pi\rho_0|A|^2\left(\frac{\omega R_0}{c_0}\right)^3\left[\frac{11(1-\lambda_\rho)}{5\lambda_\rho}\frac{R_0}{\delta_v} + \frac{(\gamma_0-1)\delta_t}{\lambda_\kappa\tilde{\delta}_t}\frac{R_0}{\tilde{\delta}_t}\right].$$ Equation 1

In Equation 1, $\omega=c/\lambda$, where $\lambda$ is the wavelength of the ultrasonic power introduced into the chamber, and c is the speed of sound in the contents of the chamber. A is the pressure amplitude of the acoustic wave. In addition, $\lambda_\rho$ equals $\rho/\rho_0$, where ρ is the density of the particulate-containing medium (e.g., gas or water vapor) and $\rho_0$ is the equilibrium density of the pure medium. Further, $\delta_\upsilon$ equals $(2\upsilon/\omega)^{1/2}$, where ρ is the kinematic viscosity of the medium and w is as defined above. Also, $\delta_t$ equals $(2\chi_0/\omega)^{1/2}$, where $\chi_0$ is the thermal diffusivity of the pure medium and $\tilde{\delta}_t$ is the corresponding value of the particulate-containing medium. Also, $\gamma_0$ is the heat capacity ratio of the pure medium and $\lambda_\kappa$ equals $\kappa/\kappa_0$, where κ and $\kappa_0$ are the thermal conductivities of the particulate-containing medium and pure medium, respectively.

The ultrasonic power may be delivered continuously or in a pulsed manner. The ultrasonic power may be delivered in a pulsed manner having a duty cycle of about 50% to about 100%. Examples of duty cycles in which the ultrasonic power may be delivered includes about 50%, about 60%, about 70%, about 80%, about 90%, about 100%, and ranges between any two of these values.

A second gas may be introduced into the chamber at an supersonic speed, thereby cooling at least some of the atomized water in the chamber to form some number of nucleating ice crystals 440. The supersonic gas may be introduced at a speed of about Mach 1 to about Mach 2. Examples of supersonic gas speed may include about Mach 1, about Mach 1.2, about Mach 1.4, about Mach 1.6, about Mach 1.8, about Mach 2.0, and ranges between any two of these values. In one non-limiting embodiment, the supersonic gas may be introduced in a continuous manner. In another non-limiting embodiment, the gas may be introduced in a pulsed manner having a duty cycle. Non-limiting examples of a duty cycle for the introduction of the ultrasonic gas may include 50%, 60%, 70%, 80%, 90%, 100%, and ranges between any two of these values.

In some embodiments, water vapor in the chamber may condense on the nucleating ice crystals to form water droplets 450. The ultrasonic power may then induce at least some of the particulates in the chamber to contact the nucleating ice crystals and/or water droplets 460. The water droplets including the particulates may then be collected 470. In one embodiment, the water droplets including the particulates may be collected by at least one receptacle placed at or on the bottom of the chamber.

EXAMPLES

Example 1: A System for Removing Particulates from a Gas

A rectangular chamber about 60 cm wide, about 60 cm high, and about 100 cm long made from plastic, such as polyethylene, was provided. The chamber included an inlet valve to permit air containing a particulate to enter the chamber. An outlet was also provided to allow the gas to exit once the particulates had been removed. Attached to opposite, transverse, sides of the chamber were a pair of piezoelectric ultrasound transduces, one transducer per side. The transducers were glued to the exterior surface of the chamber wall using an epoxy glue. A receptacle was provided at the bottom of the chamber, the receptacle having a width of about 1 mm, a height of about 1 mm, and a length of about 100 cm, thereby extending about the entire length of the chamber. Supersonic gas was introduced into the chamber by forcing the gas through a de Laval nozzle. Water vapor was created through the use of a piezoelectric device, and the water vapor was introduced into the chamber through a water inlet valve. The supersonic gas introduced into the chamber made the gas temperature in the chamber drop quickly to generate ice crystal nuclei. As a result, the particulates could aggregate around the ice crystal nuclei and eventually drop down to the receptacle.

Example 2: A Method for Removing Particulates from a Gas

The system disclosed above in Example 1 was provided. The ultrasonic transducers on the sides of the chamber were configured to provide about 75 W of acoustic energy at about 1 MHz. The supersonic gas was introduced continuously into the chamber at about Mach 2. Water vapor, as atomized water, was also introduced into the chamber in a continuous manner. The particulate containing gas included polymer particles with a diameter of about 200-400 nm suspended in water vapor. Under the influence of the 1 MHz acoustic energy, these particles were entrained near the acoustic pressure nodes and typically aggregated at the pressure nodes to form particle clusters within about 30 s. Once the diameter of the particle clusters exceeded about several tens microns, they fell under gravity into the receptacles below. System efficiency may be improved by increasing the power of the acoustic energy, thereby decreasing the time for particle aggregation. System efficiency may also be improved by increasing the velocity of the supersonic gas, thereby decreasing the temperature in the chamber at a fast rate and thus increasing the rate of ice crystal nuclei formation.

Example 3: Particulate-Containing Gases

Water vapor including fine salt crystals was treated in a system essentially the same as that disclosed above in Example 1 and essentially according to the method disclosed above in Example 2. The concentration of the salt particles in the water vapor was initially about 10 g/l. Aggregation time of the salt crystals was about 50 s. It is believed that the aggregation time for the gas sample containing salt crystals may be greater than the aggregation time of the gas sample including the polymer particles due to the greater mass of the salt crystals with respect to the polymer particles. It is suggested that the increased mass of the salt particles may require increased acoustic energy to cause aggregation.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated in this disclosure, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, or compositions, which can, of course, vary. It is also to be understood that the terminology used in this disclosure is for the purpose of describing particular embodiments only, and is not intended to be limiting.

With respect to the use of substantially any plural and/or singular terms in this disclosure, those having skill in the art can translate from the plural to the singular and/or from the singular to the plural as is appropriate to the context and/or application. The various singular/plural permutations may be expressly set forth in this disclosure for sake of clarity. It will be understood by those within the art that, in general, terms used in this disclosure, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed in this disclosure also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed in this disclosure can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member.

From the foregoing, it will be appreciated that various embodiments of the present disclosure have been described for purposes of illustration, and that various modifications may be made without departing from the scope and spirit of the present disclosure. Accordingly, the various embodiments disclosed are not intended to be limiting, with the true scope and spirit being indicated by the following claims.

What is claimed is:

1. A system to remove a plurality of particulates from a particulate-containing gas, the system comprising:
a chamber;
a source of the particulate-containing gas, comprising an inlet valve in fluid communication with the chamber;
a source of a supersonic gas in fluid communication with the chamber, wherein the supersonic gas is a non-flammable gas;
a source of water vapor in fluid communication with the chamber; and
at least one ultrasonic transducer in acoustic communication with the chamber.

2. The system of claim 1, wherein the chamber has a rectangular cross section or a circular cross section.

3. The system of claim 1, wherein the source of the supersonic gas comprises a gas accelerating inlet comprising a first side and a second side, and a source of a cooling gas, wherein the first side of the gas accelerating inlet is in fluid communication with the source of the cooling gas and the second side of the gas accelerating inlet is in fluid communication with the chamber.

4. The system of claim 3, wherein the gas accelerating inlet is a de Laval nozzle.

5. The system of claim 3, wherein the cooling gas is a dry non-flammable gas.

6. The system of claim 3, wherein the cooling gas is one or more of the following: dry air, dry argon, and dry carbon dioxide.

7. The system of claim 3, further comprising:
a gas compressor in fluid communication with the source of the cooling gas;
a pressure meter in fluid communication with the first side of the gas accelerating inlet;
a valve disposed between the source of the cooling gas and the first side of the gas accelerating inlet; and
a control system configured to control at least one activity of the valve.

8. The system of claim 1, wherein the source of water vapor comprises a water inlet valve with a first side and a second side, wherein the first side of the water inlet valve is in fluid communication with an ultrasonic atomizer, and the second side of the water inlet valve is in fluid communication with the chamber.

9. The system of claim 8, wherein the ultrasonic atomizer comprises at least one piezo-electric element.

10. The system of claim 9, wherein the at least one piezo-electric element is configured to operate at a frequency about 0.1 MHz to about 1 MHz.

11. The system of claim 8, further comprising a controller of the ultrasonic atomizer.

12. The system of claim 1, wherein the chamber comprises at least two opposing walls, and the at least one ultrasonic transducer is in acoustic communication with each of the at least two opposing walls.

13. The system of claim 1, wherein the at least one ultrasonic transducer is configured to operate at about 1 MHz to about 100 MHz.

14. The system of claim 1, wherein the at least one ultrasonic transducer is configured to produce less than or about 750 W of power.

15. The system of claim 1, wherein the at least one ultrasonic transducer is a piezoelectric transducer.

16. The system of claim 1, wherein the at least one ultrasonic transducer is placed in acoustic communication with at least one exterior surface of the chamber.

17. The system of claim 1, wherein the chamber has at least one dimension, the at least one dimension sized to promote an acoustic resonance at a wavelength produced by the at least one ultrasonic transducer.

18. The system of claim 1, further comprising at least one receptacle disposed within the chamber and configured to receive at least a portion of the plurality of particulates.

19. A method to remove particulates from a gas, the method comprising:
introducing a first gas comprising a non-flammable gas and a plurality of particulates into a chamber;
introducing atomized water into the chamber;
introducing ultrasonic power into the chamber;
introducing a supersonic second gas into the chamber to cool at least some of the atomized water to form a plurality of nucleating ice crystals;
allowing a plurality of water droplets to form on at least some of the plurality of nucleating ice crystals;
allowing the ultrasonic power to induce at least some of the plurality of particulates to contact the water droplets; and
collecting the plurality of water droplets and the plurality of particulates in contact therewith.

20. The method of claim 19, wherein introducing the first gas comprises introducing a first dry non-flammable gas.

21. The method of claim 19, wherein introducing the first gas comprising the non-flammable gas and the plurality of particulates comprises introducing a first dry non-flammable gas comprising the plurality of particulates having an average size of about 10 nm to about 1 μm.

22. The method of claim 19, wherein introducing the first gas into the chamber comprises pumping the first gas into the chamber.

23. The method of claim 19, wherein introducing the atomized water into the chamber comprises introducing about 1 L to about 20 L of the atomized water.

24. The method of claim 19, wherein introducing the ultrasonic power into the chamber comprises introducing the ultrasonic power into the chamber in a continuous manner or in a pulsed manner.

25. The method of claim 19, wherein introducing the ultrasonic power into the chamber comprises introducing the ultrasonic power into the chamber in a pulsed manner having a duty cycle of about 50% to about 100%.

26. The method of claim 19, wherein introducing the supersonic second gas into the chamber comprises introducing the supersonic second gas is introduced into the chamber at a speed of about Mach 1 to about Mach 2.

* * * * *

UNITED STATES PATENT AND TRADEMARK OFFICE
CERTIFICATE OF CORRECTION

PATENT NO. : 9,744,495 B2  
APPLICATION NO. : 14/427037  
DATED : August 29, 2017  
INVENTOR(S) : Tu et al.

Page 1 of 1

It is certified that error appears in the above-identified patent and that said Letters Patent is hereby corrected as shown below:

In the Specification

In Column 8, Line 6, delete "ρ" and insert -- υ --, therefor.

In Column 8, Line 7, delete "W" and insert -- ω --, therefor.

In the Claims

In Column 12, Line 62, in Claim 26, delete "gas is introduced into" and insert -- gas into --, therefor.

Signed and Sealed this  
Eighth Day of May, 2018

Andrei Iancu  
*Director of the United States Patent and Trademark Office*